United States Patent [19]

van Kattenbroek

[11] Patent Number: 4,522,293

[45] Date of Patent: Jun. 11, 1985

[54] DEVICE FOR TRANSFERRING EGGS FROM A FEEDING CHAIN TO RETAINING MEMBERS MOVING BEHIND EACH OTHER

[75] Inventor: Hendrik J. van Kattenbroek, Barneveld, Netherlands

[73] Assignee: Moba Holding Barneveld B.V., Barneveld, Netherlands

[21] Appl. No.: 332,597

[22] Filed: Dec. 21, 1981

[30] Foreign Application Priority Data

Jan. 9, 1981 [NL] Netherlands ........................ 8100085

[51] Int. Cl.[3] ........................................ B65G 47/24

[52] U.S. Cl. .................................... 198/377; 198/479

[58] Field of Search ............... 198/478, 479, 377, 653, 198/694, 695, 696, 570, 462

[56] References Cited

U.S. PATENT DOCUMENTS

| | | | |
|---|---|---|---|
| 3,220,154 | 11/1965 | van der Schoot | 53/246 |
| 3,370,691 | 2/1968 | Mosterd | 198/377 |
| 3,703,309 | 11/1972 | Mosterd | 294/86 |
| 3,858,709 | 1/1975 | Banyas et al. | 198/344 |
| 4,101,020 | 7/1978 | Langen | 198/462 |

*Primary Examiner*—Joseph E. Valenza
*Assistant Examiner*—Kyle E. Shane
*Attorney, Agent, or Firm*—Larson and Taylor

[57] ABSTRACT

An egg handling machine having one and preferably two or more egg feeding chains, first retaining members to which the eggs are transferred from the chains and which are each provided with a gripper to positively hold an egg and rotate it to orient its axis vertical and second retaining members moving in a line or preferably two or more lines vertically aligned with the first ones for each receiving an egg from one first retaining member.

9 Claims, 5 Drawing Figures

DEVICE FOR TRANSFERRING EGGS FROM A FEEDING CHAIN TO RETAINING MEMBERS MOVING BEHIND EACH OTHER

FIELD OF THE INVENTION

The present invention relates to a device for transferring eggs from a feeding chain.

BACKGROUND OF THE INVENTION

The prior art includes devices for transferring eggs. For example, such a device has been described in the U.S. Pat. No. 3,370,691 to Mosterd. This patent discloses a device for transferring eggs from a feeding chain provided with egg supporting means adapted to support rows of eggs with their axes horizontally, driving means for said chain to move it in a direction transverse to said rows, a first group of retaining members each of which is adapted to receive and grip one egg of each row with its axis horizontal and is provided with means to rotate said egg into a position in which its axis is vertical and a series of second retaining members mounted to a conveyor, such that the second retaining members move along a predetermined path the one behind the other.

U.S. Pat. No. 3,220,154 to Vander Schoot discloses an egg transfer system in which eggs, supplied in rows on feeding chains, are rotated with their points down by means of diverging plates. The eggs are then received in first retaining members and from these transferred to second retaining members moving in a line behind one another. These first retaining members do not rotate the eggs and the eggs are not positively held when rotated between the diverging plates.

It is remarked that the U.S. Pat. No. 3,858,709 to Banyas et al shows an apparatus for transferring objects from one station to another. In this apparatus two conveyors with retaining members are present, which conveyors define paths in which part of the retaining members are vertically aligned. The conveyed objects are transferred from the retaining members of the first conveyor to those of the second conveyor in the said part of the conveyor paths. None of the retaining members is able to carry out a tilting movement and the transfer is realized by means of suction cups provided with control means to admit vacuum. Such a means are mechanically controlled by the objects to be transferred. It is severely doubted whether this construction can be used when the objects to be transferred are eggs if one wants to avoid breakage or slight damages that later on reduce the egg's quality.

SUMMARY OF THE INVENTION

The invention aims to provide a device that covers less floor area. A further object of the invention is, to provide a device of the indicated type that is simple of construction.

Still a further object of the invention is to provide a device of the indicated type in which the transfer from a first to a second retaining member may be smoother and more shockfree than with the known construction.

The above aims are realized in that the first and second retaining members are located vertically above one another in a predetermined region of a predetermined path of travel of the second retaining members. In this predetermined region the first retaining members at least temporarily hold the eggs such that the egg axes are vertical. Also in this region are further means to transfer the eggs from the first to the second retaining members.

According to a further elaboration of the invention it is provided that in the said region the first and second retaining members move above each other in the same direction.

According to the further elaboration of the invention it is provided that the said second retaining members are mounted to balances, guide means being present to move said retaining members vertically. This feature allows a very simple control of the height of the second retaining members by controlling the balances' arms and letting the balances themselves follow a horizontal path.

In practice with an egg handling machine the lateral space occupied by an egg on the feeding chain will be greater than the space occupied by a second retaining member. The reason is that the space occupied by an egg can hardly be reduced, whereas the distance from one retaining member to the next one has to be made as small as possible in order to reduce the conveying speed of these retaining members as much as possible. Because the normal distance from one first retaining member to the next one equals the distance from one egg to the next one in a row on the feeding chain, it will be obvious that often the distance from one second retaining member to the next one will be smaller than the distance from one second retaining member to the next one. Accordingly, it is provided that with a device according to the present invention said first retaining members consist of first grippers having retaining fingers of which at least one is movable with respect to at least one other, and said second retaining members consist of grippers having retaining fingers of which at least one is movable with respect to at least one other. Further, control means are present in the said region firstly to cause the movable finger of the second retaining members to move toward the at least one other finger of said second retaining member and secondly to cause the movable finger of the said first retaining members to move away from the at least one other finger of said first retaining member. Secondly, there are control means in the said region to move the second retaining members vertically toward the said first retaining members and thereafter again away from the latter, said first retaining members being mounted to a conveyor and provided with a control member. A control cam is also present in the said region to control the angular position of the said first retaining members, said control cam having such a shape that at the location in the said region in which the movable finger of a second retaining member moves toward the at least one other finger of the said second retaining member the said first retaining member is somewhat tilted backward in relation to the direction of movement of the conveyor to which it is mounted.

With such an embodiment of the invention it is easy to obtain a smooth and almost noiseless working of the device by providing a control cam to control the movement of the said movable finger of the first retaining members away from the other fingers of the same first retaining members in a shockfree gradual way.

An even smoother and more reliable operation of the device can be obtained by providing a control cam to cause the first group of retaining members to tilt somewhat in the region where the said first and second retaining members come in each others path.

A special useful embodiment of the invention comprises an egg handling machine provided with two or more feeding chains, each of which is provided with egg supporting means adapted to support rows of eggs and driving means for said feeding chains to move them in a direction transverse to said rows, at least two sets of first retaining members, each set being adapted to receive the eggs from one row of one of the said feeding chains, at least two series of second retaining members, each series being mounted in line with one behind the other to a conveyor such that its said second retaining members move when their conveyor moves. It is provided that the said conveyors of the second retaining members move along mutual parallel paths besides each other, each of the first retaining members being vertically aligned with one of the second retaining members in part of said paths, said feeding chains being located the one besides the other.

Such an egg handling machine combines a high capacity with a limited floor area and logically arranged feeding chains thereby reducing the number of personnel. Furthermore, the machine is easily monitored and the feeding part of it is relatively simple.

According to a further improvement of this concept it is provided that the said first retaining members are mounted to at least two conveyors each moving in a vertical plane, said conveyors overlapping in the direction of movement of the conveyors of the second retaining members.

BRIEF DESCRIPTION OF THE DRAWINGS

One embodiment of the invention is depicted in the drawings, in which.

DETAILED DESCRIPTION OF THE PREFERRED EMBODIMENT

Figure 1:
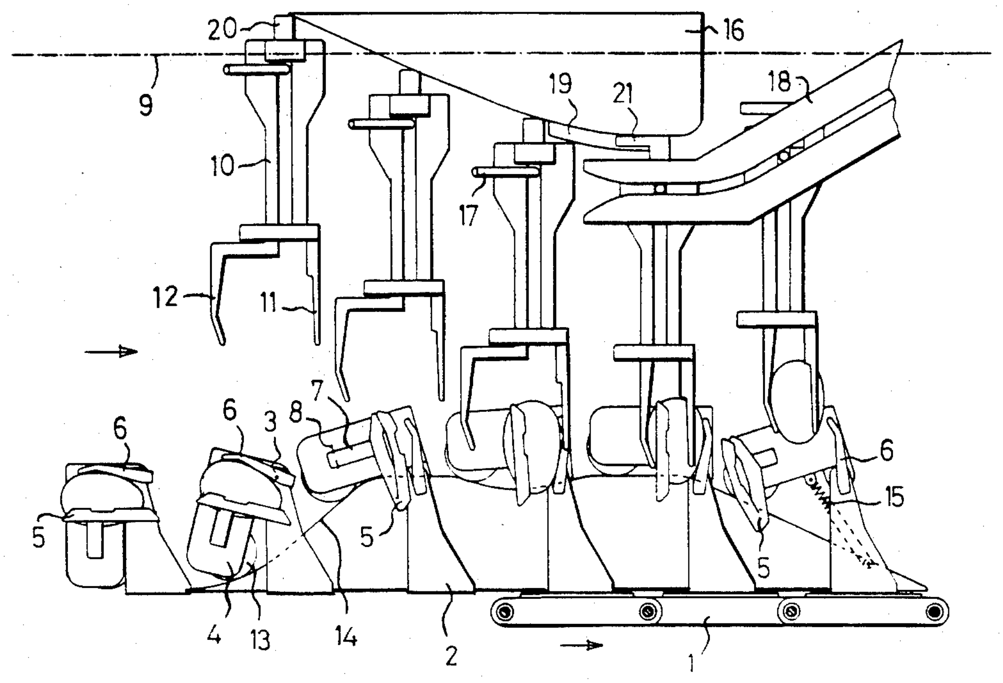
FIG. 1 shows schematically a side view of a device according to the invention.

In FIG. 1 supporting members 2 are depicted as mounted to a chain conveyor 1. Each member has a shaft 3 about which a gripper or container 4 can pivot. The gripper 4 is provided with a double gripper finger 5 having the shape of a one-sided open O and an opposed single gripper finger 6. The double gripper finger 5 is mounted to an arm 7 that can pivot about a shaft schematically indicated at 8. The mechanism for activating this shaft is organized in the same way as indicated in the U.S. Pat. No. 3,370,691 to Mosterd, except that the opening operation of the gripper 4 is caused by control cams mounted along the track such that the operation occurs gradually, as elucidated below with respect to the description of FIG. 4.

Figure 2:
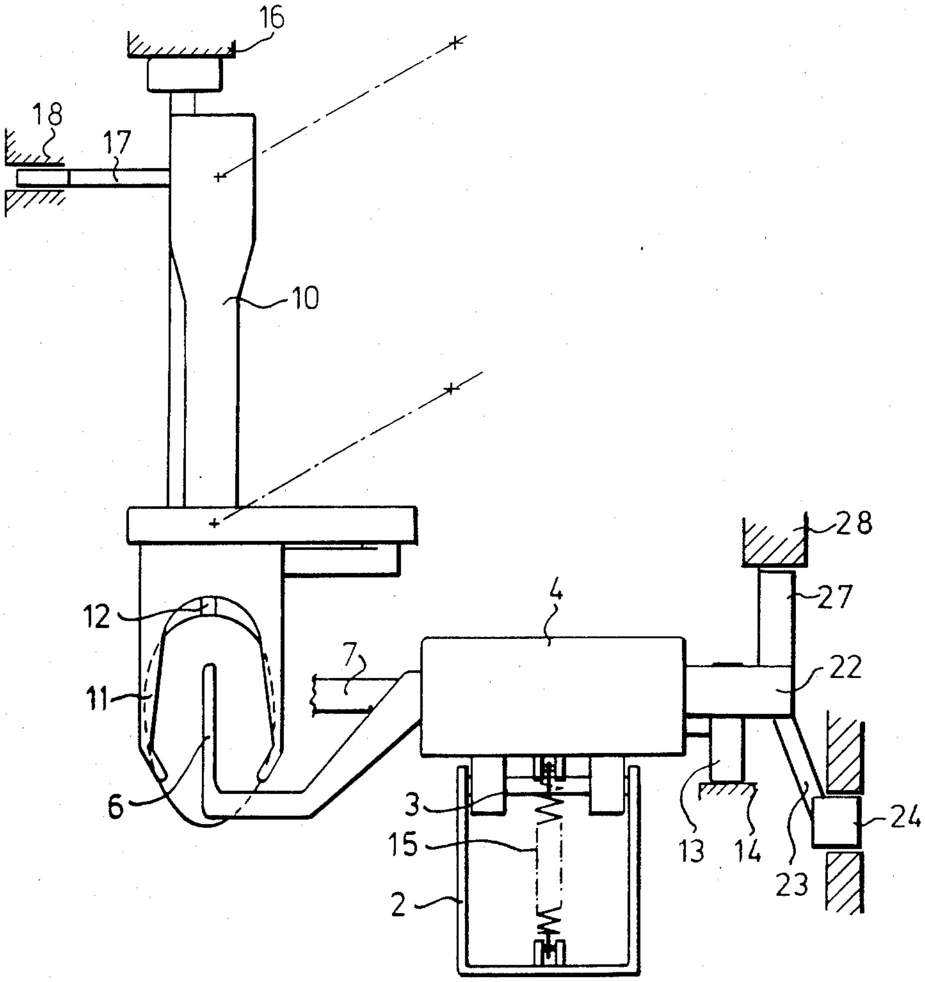
FIG. 2 shows schematically a view of a set of cooperating grippers seen in the direction of movement of the conveyors in which the upper gripper is shown in the closed position.

To a conveyor 9 mounted above conveyor 1 balances have been mounted, the balance arm of which as well as a coupling link forming a parallellogram with it as shown in FIG. 2 with dash-dot lines. The gripper portion 10 of the balance can be controlled vertically by means of a control cam 16. This gripper portion contains a leading fixed set of two gripper fingers 11 and a single gripper finger 12 that is controllably pivotable about an axis. Single gripper finger 12 has a resilient drive such that an egg clamped between it and the fingers 11 is not crushed. Such a gripper has been disclosed in the U.S. Pat. No. 3,703,309 to Mosterd.

Each of the grippers of the lower conveyor is provided with a follower roller 13 running on a control cam 14. The gripper shown at the outmost left side in FIG. 1 has its fingers 5 and 6 horizontal and is kept in this position by a spring 15 connected between support member 2 and gripper 4 visible in the gripper shown at the right side and in FIG. 2. When the conveyor moves toward the right the roller 13 engages the rising part of the cam 14, causing the gripper to tilt. At the location of the rising part of cam 14 causing the tilting movement of the gripper 4, the grippers 10 of the conveyor 9 move downward under control of the control cam 16 cooperating with the upper part 20 of the grippers 10. At this location the grippers 4 and 10 cross each other's track. The grippers 10 of the conveyor 9, however, avoid contacting the grippers 4 of conveyor 1 and any eggs held by the corresponding gripper fingers 5 and 6, because the fingers 12 are still in their opened position.

In operation, conveyor 1 runs faster than the conveyor 9. The grippers of converyor 1 are spaced apart a greater distance in comparison with the spacing of grippers 10 of conveyor 9 and the speeds of conveyors 1 and 9 are related to this spacing difference such that the two fingers 11 of the upper gripper are positioned at both sides of the single finger 6 of the lower gripper, in which position the finger 12 of the upper gripper can be closed to effect a transfer of an egg held by gripper 4.

The vertical movement of the gripers 10 in this part is controlled by the cooperation of the upper part 20 of these grippers with the control cam 16. Closing of the grippers is effected by an arm 21 coupled to the gripper finger 12 cooperating with a cam 19.

At the location where grippers 10 are closed, an arm 17, which supports a follower roller at its end, is pivoted into a position perpendicular to the direction of movement of the conveyors. In this position this roller comes between the controlling surfaces of a further control cam 18. Also, at this location, the vertical extent of cam 16 ends and cam 18 takes over the vertical control of the gripper 10. Further at this location, the double finger 5 of the lower gripper is pivoted open by the pivoting of the arm 7, which prevents an egg from being crushed between the fingers 11 of the upper gripper 10 and the double finger 5 of the lower gripper 4 as a result of conveyor 1 moving faster than conveyor 9. The gripper shown in FIG. 1 at the outmost right position shows the double finger 5 in the completely opened position. From this drawing it is shown that ample free space is present between the fingers when in this position and the egg so that time is available for a gradual opening movement of the fingers.

Figure 3:
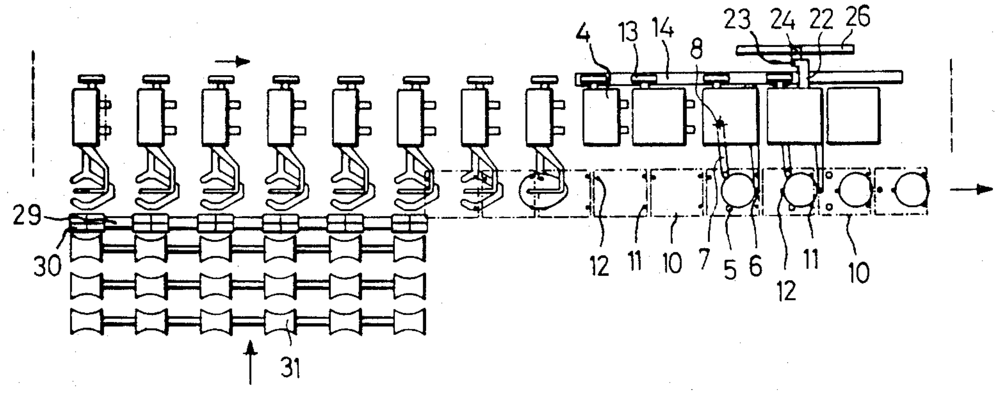
FIG. 3 shows a plan view of the device according to FIGS. 1 and 2.
Figure 4:
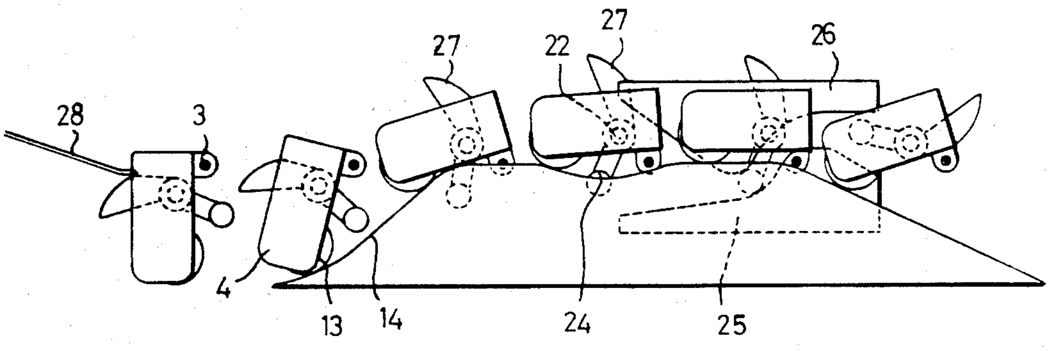
FIG. 4 shows a view that is analogous to FIG. 1 but in which the opening of the grippers is elucidated.

As more specially appears from FIGS. 3 and 4, each gripper supports a shaft 22 to which an arm 23 is mounted and which in turn supports a control roller 24 at its end. This roller 24 cooperates with two control cams 25 and 26, which together define a control slit having a shape so as to effect a gradual pivoting movement of the shaft 22 and to give rise to a well controlled opening movement of the double gripper finger 5.

Further, shaft 22 bears a cam arm 27, which by cooperation with a cam 28 (shown at the left side in FIG. 4) has caused the gripper 4 to close. Because roller 24 has little play in the slit defined by control cam 25 and 26, the pivot movement of the shaft 22 is well controlled and no sudden pivoting away of the gripper fingers can occur as happens with the known prior art devices.

The drawings further show that the control cam 14 in the region in which the grippers 4 and 10 approach each other is provided with a small sink or recess. By reason of this recess the lower gripper 4 is somewhat tilted, which enables somewhat more play of the fingers 11 with respect to the egg so that differences if any in the dimensions of the eggs can be better accomodated.

A similar control of the tilting movement of gripper 4 to improve the cooperation of the grippers 4 and 10 occurs with or shortly after the closing of the gripper 10. There the tilting movement of the grippers 4 causes them to pivot somewhat in the counter-clockwise direction, and which may be an advantage to gain time for a gradual movement.

Figure 5:
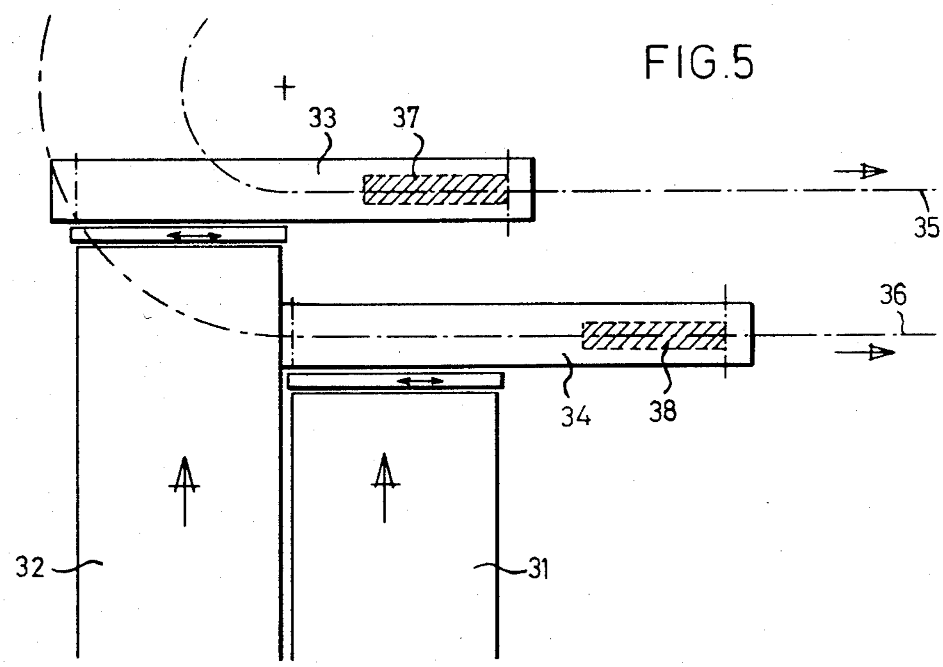
FIG. 5 schematically shows the device according to the invention used with an egg grading machine having two parallel roller tracks for moving eggs parallel to the device.

In FIG. 5 references 31 and 32 are roller tracks for feeding eggs. These tracks cooperate with devices according to the invention, which have been schematically depicted at 33 and 34. The transfer from the tracks 31 and 32 onto the devices 33 and 34 occurs with second conveyor 35 and 36 in the way indicated in the cited U.S. Pat. No. 3,370,691 to Mosterd. This is depicted here in FIG. 3 by means of a rod 29 which can move axially to pivot with the tracks. Rod 29 supports cups 30 which can receive an egg and lay it down on the lower finger 5 of the grippers 4.

After the eggs are in the gripper 4, these grippers are closed, tilted and, after the transfer of the eggs to the upper gripper 10, are tilted back again. This movement respectively occurs in the regions 37 and 38 (FIG. 5).

In this way it is possible in a very simple manner to position the feeding tracks 31 and 32 along side each other. This is important in order to have a supply of eggs that is surveyable and a servicing of the machine that is simple. It further appears that the present invention provides the capability of positioning devices for transferring eggs onto a plurality of parallel tracks, one partly beside the other, and this provides an important space saving feature. A further advantage of the invention is that the device according to the invention has a conveyor that moves in a vertical plane. This feature provides an important space saving feature in comparison with a conveyor moving in a horizontal plane.

What I claim is:

1. Device for transferring eggs from a source of eggs in which the egg axes are horizontal, said device comprising an endless conveying means for conveying in a vertical plane;

first retaining members mounted on said conveying means for receiving and gripping an egg which axis is horizontal, each of said first retaining members comprising a plurality of gripping fingers, at least one of which is movable with respect to at least another gripping finger, and means for rotating the egg into a position in which the egg axis is vertical;

a conveyor;

a plurality of second retaining members mounted on said conveyor and comprising a plurality of gripping fingers, at least one of which is movable with respect to at least another gripping finger, said conveyor moving said second retaining members along a predetermined path in a line, one behind the other, said path being such that corresponding ones of said first and second retaining members are located vertically above one another in a predetermined region of said path and move in the same direction;

means for controlling said movable fingers of said first and second retaining members when in said region;

means coordinated with said controlling means for rotating each of said first retaining members in a parallel direction to the direction of movement when in said region such that when said parallel rotation occurs, said first retaining member movable finger is moved away from said another gripping finger and said second retaining member movable finger is moved toward said another gripper finger; and means for vertically moving said first and second retaining members relative to each other when in said region.

2. The device according to claim 1 characterized in that the relative distance between said first retaining members is greater than the relative distance between said second retaining members; and in that the speed of movement in the conveyed direction of said first retaining members is greater than the speed of movement in the conveyed direction of said second retaining members.

3. The device according to claim 2 characterized in that said means for rotating said first retaining members is comprised of a cam, said cam having a main sloping part followed, with respect to the conveyed direction, by a smaller part sloping in the direction opposite to the slope of said main sloping part.

4. The device according to claim 3 characterized in that said cam has a further sloping part following, with respect to the conveyed direction, said smaller part, said further sloping part sloping in the direction of said main sloping part and then steeply sloping in the opposite direction thereof;

and further characterized in that said first retaining members further comprise a cam follower for moving said movable gripper finger thereof;

and said device further including a further cam having a control slit engagable by said cam follower at a location near said steeply sloping part, said control slit having a shape so as to effect a gradual movement of said cam follower thereby causing a well controlled opening movement of said movable gripper finger as said first retaining member is rotated again in a parallel direction.

5. Device for transferring eggs from a source of eggs in which the egg axes are horizontal, said device comprising a first conveyor for conveying in a vertical plane;

a plurality of first retaining members mounted on said first conveyor, each said member receiving and gripping an egg which axis is horizontal, each of said first retaining members comprising a plurality of gripping fingers, at least one of which is movable with respect to at least another gripping finger, and means for pivotally mounting said gripping fingers such that an egg held thereby can be rotated into a position in which the egg axis is vertical;

means for rotating said gripper fingers and an egg held thereby into a position in which the egg axis is vertical;

a second conveyor;

a plurality of second retaining members mounted to said second conveyor, each second retaining member comprising a plurality of gripping fingers, including a forward finger and a rearward finger which is movable with respect to said forward gripping finger, said second conveyor moving said second retaining members along a predetermined path in a line, one behind the other, said path being such that said second retaining members are locatable vertically above corresponding ones of said first retaining members in a predetermined region of said path and move in the same direction therewith;

means for controlling said movable fingers of said first and second retaining members when in said regions including means for rotating each of said first retaining member fingers in a backward direction from the direction of movement when at a particular area in said region, finger controlling means of said first retaining members when at said particular area in said region to release the grip on the egg, and means for moving said rearward retaining member finger toward said forward finger when in said area of said region such that when the egg has been conveyed into said particular area by said first retaining member, the egg is rotated rearwardly, is released by said first retaining member fingers and is engaged by said rearward finger of said second retaining member during the forward movement thereof whereby the transfer of the egg to the second retaining member is effected;

means for moving said gripping fingers of said first retaining members upwardly when in said region; and means for moving said gripping fingers of said second retaining members downwardly when in said region such that said second retaining member fingers can engage and pick up an egg held by the corresponding fingers of said first retaining member as said controlling means respectively controls the disengagement and engagement of said first retaining means fingers and said second retaining means fingers.

6. Device according to claim 5 in which said second retaining members are mounted to balances; and in which said guide means cooperates with said balances for vertically moving said second retaining means in said region.

7. Device according to claim 6, characterized in that said controlling means includes a control cam present in the said region to control the angular position of the said first retaining members, said control cam having such a shape that at the location in the said region in which the rearward movable finger of a second retaining member moves towards said forward finger of the said second retaining member, the said first retaining member is somewhat tilted backward in relation to the direction of movement of the conveyor to which it is mounted.

8. Device according to claim 7, characterized in that a control cam is present to control the movement of the said movable finger of the first retaining members away from the other fingers of the same first retaining members in a shockfree gradual way.

9. Egg handling machine as claimed in claim 5 which is provided with two or more feeding chains, located besides each other, each of which is provided with egg supporting means adapted to support rows of eggs; driving means for said feeding chains to move them in a direction transverse to said rows; at least two sets of first retaining members, each set being adapted to receive the eggs from one row of one said feeding chains; at least two series of second retaining members each series being mounted to a conveyor such that its said second retaining members move, when their conveyor moves, the one behind the other in a row, characterized in that the said conveyors of the second retaining members move along mutual parallel paths besides each other, each of the first retaining members being vertically aligned with one of the second retaining members in part of said paths; and wherein said first retaining members are mounted to at least two conveyors each moving in a vertical plane; and said conveyors overlap in the direction of movement of the conveyors of the second retaining members.

* * * * *

UNITED STATES PATENT AND TRADEMARK OFFICE

CERTIFICATE OF CORRECTION

PATENT NO. : 4,522,293

DATED : June 11, 1985

INVENTOR(S) : Van Kattenbrock

It is certified that error appears in the above-identified patent and that said Letters Patent is hereby corrected as shown below:

Please correct the front page of the patent to indicate the assignee as follows:

[73] Assignee: Administratie - En Automatiseringscentrum Vulcaan B.V.
Prof. E.M. Meijerslaan 1, 1183 AV
Amsterlveen, The Netherlands Signed and Sealed this

*Twenty-fifth* Day of *February 1986*

[SEAL]

*Attest:*

DONALD J. QUIGG

*Attesting Officer* *Commissioner of Patents and Trademarks*